United States Patent
Voorwinden et al.

(10) Patent No.: US 8,994,341 B2
(45) Date of Patent: Mar. 31, 2015

(54) BATTERY CHARGING CIRCUIT AND ELECTRONIC DEVICE

(75) Inventors: Cor Voorwinden, Toulouse (FR); Alexandre Crisnaire, Tournefeuille (FR)

(73) Assignee: Freescale Semiconductor, Inc., Austin, TX (US)

( * ) Notice: Subject to any disclaimer, the term of this patent is extended or adjusted under 35 U.S.C. 154(b) by 583 days.

(21) Appl. No.: 13/375,802

(22) PCT Filed: Jun. 29, 2009

(86) PCT No.: PCT/IB2009/053231
§ 371 (c)(1),
(2), (4) Date: Dec. 2, 2011

(87) PCT Pub. No.: WO2011/001225
PCT Pub. Date: Jan. 6, 2011

(65) Prior Publication Data
US 2012/0086407 A1    Apr. 12, 2012

(51) Int. Cl.
H01M 10/44    (2006.01)
H01M 10/46    (2006.01)
H02J 7/00    (2006.01)

(52) U.S. Cl.
CPC ................... H02J 7/0068 (2013.01)
USPC ........................................................ 320/162

(58) Field of Classification Search
USPC .......................................... 320/137, 140, 162
See application file for complete search history.

(56) References Cited

U.S. PATENT DOCUMENTS

| | | | |
|---|---|---|---|
| 5,642,029 A | 6/1997 | Seragnoli | |
| 5,783,928 A * | 7/1998 | Okamura | ..................... 320/122 |
| 5,883,497 A | 3/1999 | Turnbull | |
| 6,452,364 B1 | 9/2002 | Saeki et al. | |
| 6,495,989 B1 | 12/2002 | Eguchi | |
| 7,459,886 B1 | 12/2008 | Potanin et al. | |
| 7,482,781 B2 | 1/2009 | Voorwinden | |
| 2006/0076928 A1 | 4/2006 | Okamoto et al. | |

FOREIGN PATENT DOCUMENTS

CN    101202502 A    6/2008
GB    2296113 A    6/1996

OTHER PUBLICATIONS

International Search Report and Written Opinion correlating to PCT/IB2009/053231 dated Dec. 14, 2009.

* cited by examiner

Primary Examiner — Edward Tso (57) ABSTRACT

A battery charging circuit comprises: a first voltage regulator, wherein the first voltage regulator has a control input designed for reception of a signal generated by a current metering circuit; the current metering circuit; and a terminal for connecting a battery. An electronic device, in particular a mobile device, comprises a battery charging circuit as defined above.

20 Claims, 7 Drawing Sheets

BATTERY CHARGING CIRCUIT AND ELECTRONIC DEVICE

FIELD OF THE INVENTION

This invention relates to a battery charging circuit. Further, this invention relates to an electronic device.

BACKGROUND OF THE INVENTION

Rechargeable batteries are used in many circumstances for powering user devices. Among these devices are portable telephones, personal digital assistants, and notebooks. Therefore, a charger comprising a voltage generator is provided to recharge the battery. The charger may be realized as an AC/DC converter or as a DC/DC converter, for example for use in a vehicle. In many user devices, the battery may provide power to the user device and simultaneously be charged by the charger. Therefore, it is desirable to provide a power supply with control circuits enabling the voltage generator to serve for simultaneously supplying a load (application) with electric energy as well as for simultaneously charging the battery. Such a battery charging circuit may be realized in a power management integrated circuit of a cellular or portable device, or of any other application using a chargeable battery.

SUMMARY OF THE INVENTION

The present invention provides a battery charging circuit and an electronic device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

Figure 1:
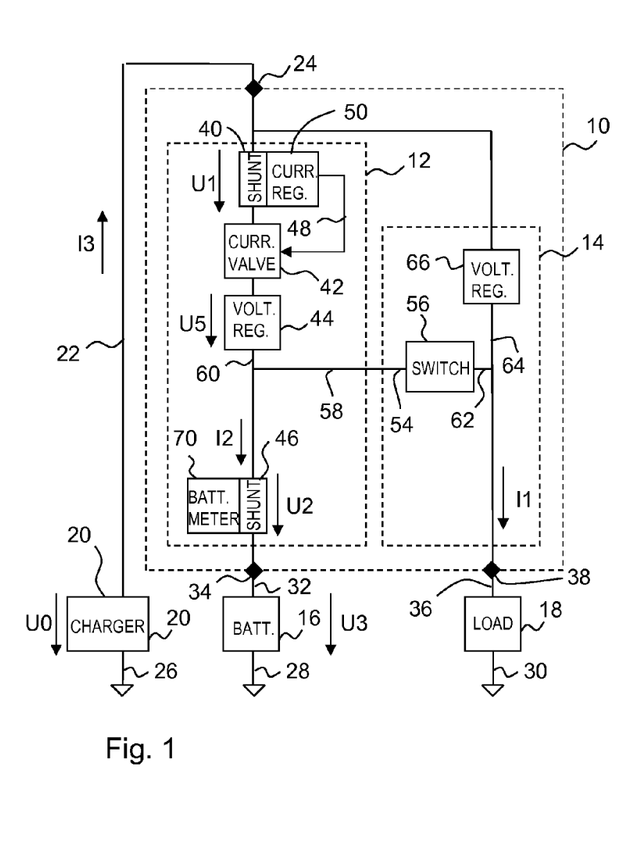
FIG. 1 shows schematically a block circuit diagram of an example of a first type of battery charging circuit.

FIG. 1 shows schematically a block circuit diagram of an example of an arrangement comprising a charger 20, a first type of battery charging circuit 10, a battery 16, and a load 18. The charger 20 provides between its terminals 22, 26 an output voltage U0. In the example, the battery charging circuit 10 comprises separated circuit portions 12, 14 for charging a battery 16 respectively for supplying a load 18 (application) with electrical energy from the charger 20. The supply terminal 22 of the charger 20 is connectable to a supply terminal 24 of the battery charging circuit 10. A mass terminal 26 of the charger 20 is connectable to a mass terminal 28 of the battery 16 and a mass terminal 30 of the load 18. A supply terminal 32 of the battery 16 is connectable to a battery terminal 34 of the battery charging circuit 10. A supply terminal 36 of the load 18 is connectable to a load terminal 38 of the battery charging circuit 10. The circuit portion 12 for charging the battery 16 comprises a second shunt 40, a current valve 42, a first voltage regulator 44, and a first shunt 46 connected in series. The current valve 42 is controlled via a first current control line 48 by a current regulator 50 measuring a tension U1 at the second shunt 40. An input 54 of a switch 56 for transferring electrical energy from the battery 16 to the load 18 is connected to a tap 58 at a connection 60 (between the first voltage regulator 44 and the first shunt 46) and a tap 62 at the connection 64 (between the second voltage regulator 66 and a supply terminal 38). For example, a purpose of the switch 56 may be to disconnect the battery 16 when it is fully discharged, because a low output voltage U3 of the battery 16 might prevent the load 18 from operating properly. A battery meter 70 measures a tension U2 at the first shunt 46. The concept of FIG. 1 may be beneficial for reducing a charge time for the battery 16, but may require a complex control function and may be costly to manufacture.

Figure 2:
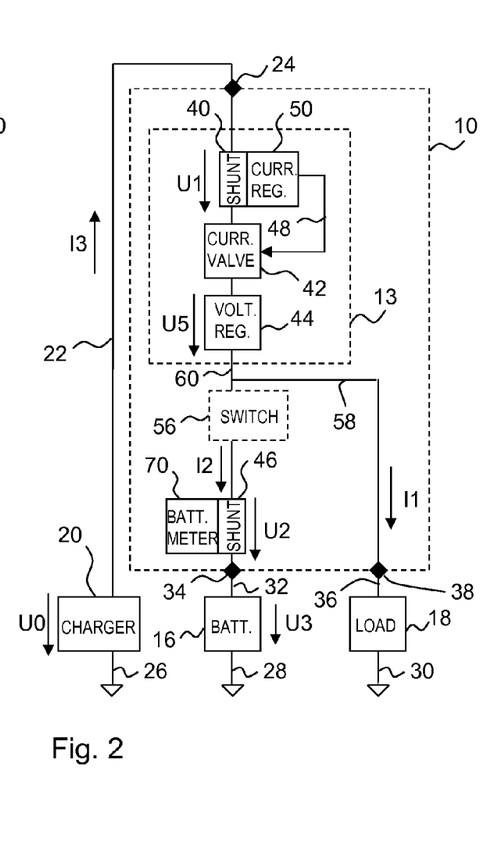
FIG. 2 shows schematically a block circuit diagram of an example of a second type of battery charging circuit.

FIG. 2 shows schematically a block circuit diagram of an example of an arrangement comprising a charger 20, a second type of battery charging circuit 10, a battery 16, and a load 18. In the example, the battery charging circuit 10 comprises a common circuit portion 13 for charging a battery 16 and for supplying a load 18 (application) with electrical energy from the charger 20. The supply terminal 22 of the charger 20 is connectable to a supply terminal 24 of the battery charging circuit 10. A mass terminal 26 of the charger 20 is connectable to a mass terminal 28 of the battery 16 and a mass terminal 30 of the load 18. A supply terminal 32 of the battery 16 is connectable to a battery terminal 34 of the battery charging circuit 10. A supply terminal 36 of the load 18 is connectable to a load terminal 38 of the battery charging circuit 10. The common circuit portion 13 comprises a second shunt 40, a current valve 42, and a first voltage regulator 44 connected in series. The current valve 42 is controlled via a first current control line 48 by a current regulator 50 measuring a tension U1 at the second shunt 40. The load terminal 38 of the battery charging circuit 10 is connected to a tap 58 at a connection 60 between the first voltage regulator 44 and a switch 56. A purpose of the switch 56 may be to disconnect the battery 16 when it is fully discharged, because a low output voltage U3 of the battery 16 might prevent the load 18 from operating properly. If this function is not desired, the switch 56 may be substituted by a wire 56. The switch 56 may connect the first voltage regulator 44 to a first shunt 46. A battery meter 70 measures a tension U2 at the first shunt 46. This concept results in an increase of a charging time of the battery 16, at times when the load 18 draws current I1 from the battery charging circuit 10.

Figure 3:
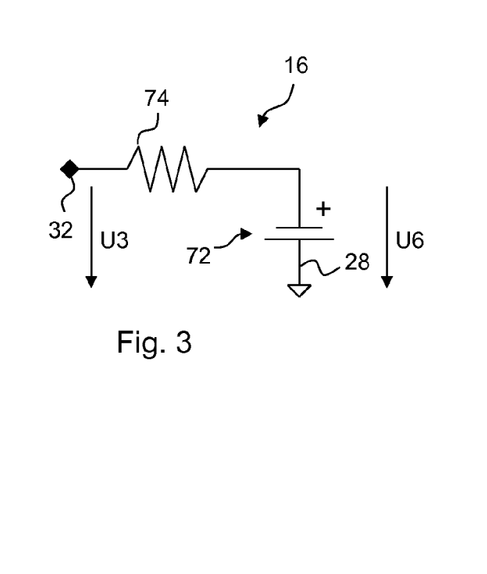
FIG. 3 shows a diagram of an example of an equivalent circuit of a battery.

FIG. 3 shows a schematic circuit diagram of an equivalent circuit of battery 16. As a rough approximation, the battery 16 behaves like an equivalent capacitance 72 to which an inner resistance 74 is connected in series. U6 designates a cell voltage in off-load mode of the battery 16. The inner resistance 74 may typically be about 250 mOhm and the equivalent capacitance 72 of the battery 16 may typically be at least 1000 Farads. Because of the voltage drop at the inner resistance 74 a change of a current I2 into (respectively out of) the battery 16 results in a change of the voltage U3 between both terminals 28, 32 of the battery 16. Measuring a charge level of the battery 16 may be inaccurate when the battery 16 is not operated in off-load mode because there are parameters which typically have a varying effect on the value of the inner resistance 74 of the battery 16. Such parameters may, for instance, be the cell voltage itself, temperature, and aging. Therefore, a more reliable method of measuring the charging level of the battery 16 is desirable.

Figure 4:
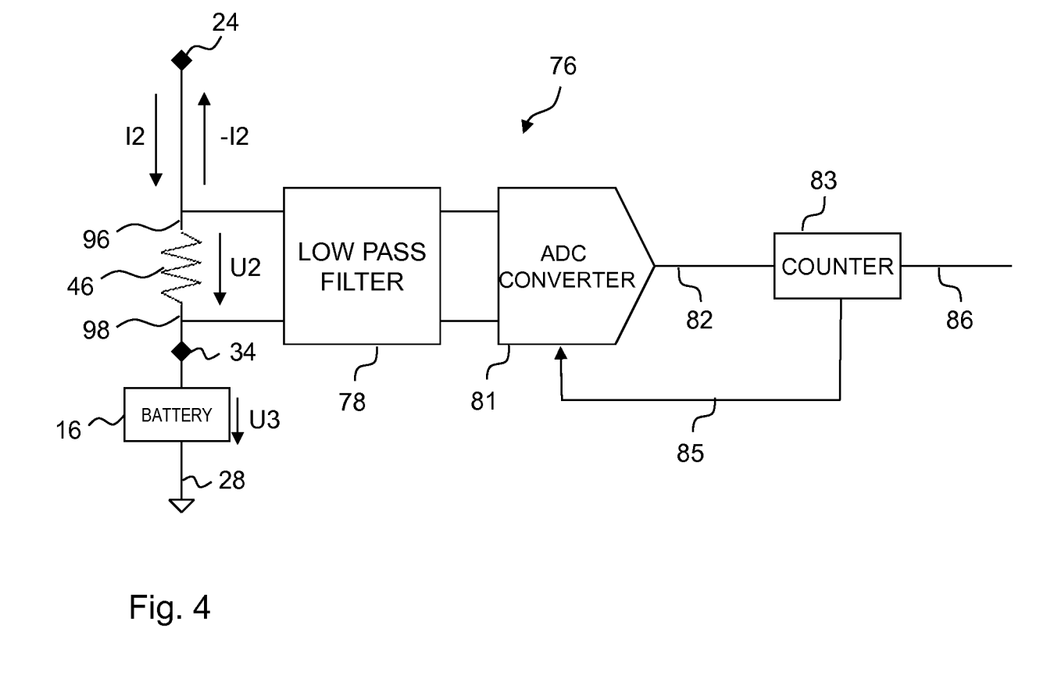
FIG. 4 shows a block circuit diagram of a first example embodiment of a metering circuit for metering a battery charge.
Figure 5:
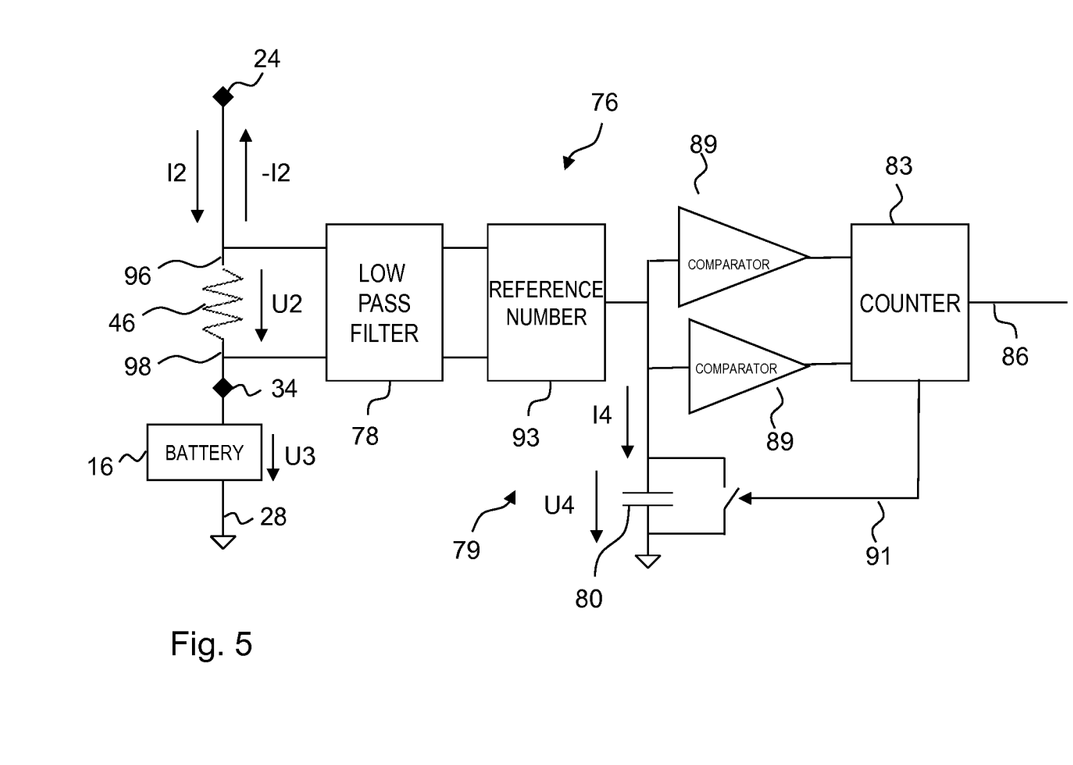
FIG. 5 shows a block circuit diagram of a second example embodiment of a metering circuit for metering a battery charge.

FIGS. 4 and 5 show schematic block circuit diagrams of different example embodiments of metering circuits 76 for metering a battery charge. Therein, a value and direction of the current I2 into (respectively out of) the battery 16 may be sampled either continuously or periodically. The sampling is performed indirectly by sampling a voltage U2 at the first shunt 46. The first shunt 46 is connected in series to the battery 16 and employed to generate the voltage U2 which may be representative for the value of the current I2 into (respectively out of) the battery 16. The battery current I2 flows through the sense resistor 46 and creates a voltage drop U2. The current I2, and therefore the voltage U2, may fluctuate very rapidly. For avoiding that the signal to be evaluated is outside of a bandwidth of the metering circuit 76, the voltage is filtered by a low pass filter 78, before being processed further. In order to accurately estimate a charge or a remaining capacity of the battery 16, each of the two metering circuits 76 may be part of an accumulated coulomb counter. The metering circuit 76 measures a total amount of charge (i.e. current I2 integrated over time) going into and flowing out of the battery 16. There are several different builds of metering circuits 76. Each of the metering circuits 76 of FIGS. 4 and 5 comprises a central counter 81 representing a remaining amount of charge in the battery 16.

In the metering circuit 76 of FIG. 4, a low power ADC converter 81 (analogue to digital converter) is employed for converting the filtered voltage U2 into a digital value 82. A central counter 83 is employed to add the digital value 82 of the filtered voltage U2 or of an integral thereof with each period of a clock 85. At fixed instances, the output value 82 of the ADC converter 81 is added to the content of a central counter 81.

FIG. 5 schematically shows a second example embodiment of the metering circuit 76, wherein the low power ADC converter 81 is replaced by an integrator 79 for converting the filtered voltage U2 into an auxiliary current I4. A voltage U4 at the integration capacitor 80 may be proportional to the amount of charge loaded into the integration capacitor 80 by the auxiliary current I4. Thus, the integration capacitor 80 may serve as an integration function. Reference number 93 designates a portion of the integrator 79 except the integration capacitor 80. The integrator 79 integrates at the integration capacitor 80 sampled voltages U2. The integration results in an integrated voltage U4, which may be representative of the amount of charge transferred into (respectively out of) the battery 16. At each instance when a predefined first threshold is crossed in a positive direction the central counter 83 is incremented and the integrator 79 is reset by a reset signal 91. Each time a predefined first threshold is crossed in a negative direction the central counter 83 is decremented and the integrator 79 is reset. A central counter 81 and a clock-driven reset mechanism are employed to convert the integrated voltage U4 into a digital value 86 indicating the amount of charge transferred into (respectively out of) the battery 16 during the total time of sampling.

Figure 6:
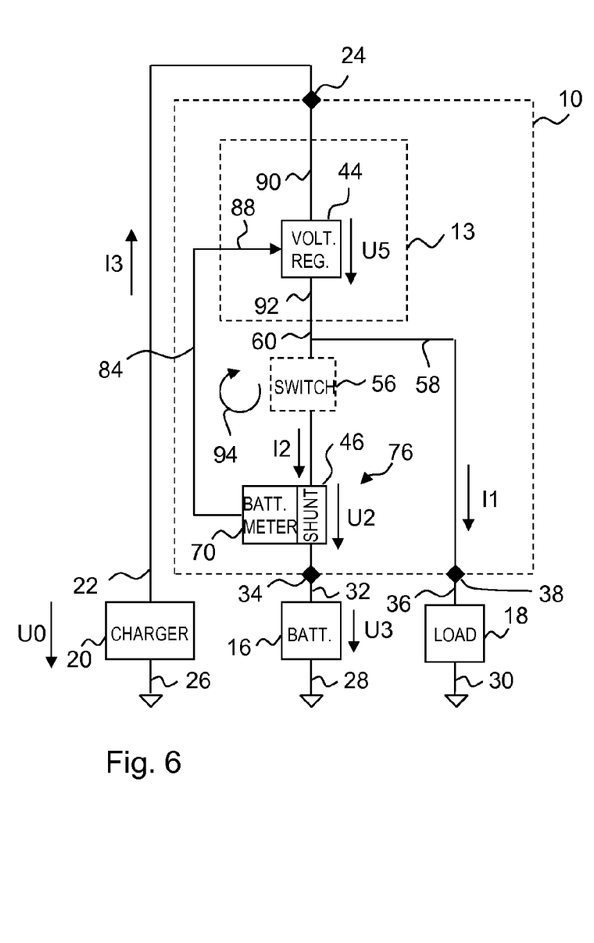
FIG. 6 shows schematically a block circuit diagram of an example of a third type of battery charging circuit.

FIG. 6 shows schematically a block circuit diagram of an example of an arrangement comprising a charger 20, a third type of battery charging circuit 10, a battery 16, and a load 18. The battery charging circuit 10 comprises a common circuit portion 13 for charging a battery 16 and for supplying a load 18 (application) with electrical energy from a charger 20. A supply terminal 22 of the charger 20 is connectable to a supply terminal 24 of the battery charging circuit 10. A mass terminal 26 of the charger 20 is connectable to a mass terminal 28 of the battery 16 and a mass terminal 30 of the load 18. A supply terminal 32 of the battery 16 is connectable to a battery terminal 34 of the battery charging circuit 10. A supply terminal 36 of the load 18 is connectable to a load terminal 38 of the battery charging circuit 10. The common circuit portion 13 comprises a first voltage regulator 44. The first voltage regulator 44 is controlled via a second current control line 84 by a metering circuit 76 for metering a battery charge. The load terminal 38 is connected to a tap 58 at a connection 60 between the first voltage regulator 44 and a switch 56. A purpose of the switch 56 may be to disconnect the battery 16 when it is fully discharged, because a low output voltage U3 of the battery 16 might prevent the load 18 from operating properly. If this function is not desired, the switch 56 may be substituted by a wire 56. The switch 56 connects the first voltage regulator 44 to a first shunt 46. A metering circuit 76 measures a tension U2 at the first shunt 46. The third type of battery charging circuit 10 comprises a metering circuit 76 as shown in FIGS. 4 and 5 for measuring an average current I2 into (respectively out of) the battery 16. An output signal 84 of the metering circuit 76 feeds a control input 88 for setting a setpoint of the first voltage regulator 44. Thereby, a digital value of a current I2 averaged over a predetermined time period is used as information to control the voltage U3 applied to the battery 16 during charging by controlling a voltage U5 between input terminal 90 and output terminal 92 of the first voltage regulator 44. When the metering circuit 76 measures a current I2 into (respectively out of) the battery 16 which is higher than allowed, the metering circuit 76 may reduce the setpoint of the voltage regulation of the voltage regulator 44 with respect to voltage U3. When the metering circuit 76 measures a current I2 into (respectively out of) the battery 16 which is lower than desired, the metering circuit 76 may increase the setpoint of the voltage regulation with respect to voltage U3.

Figure 7:
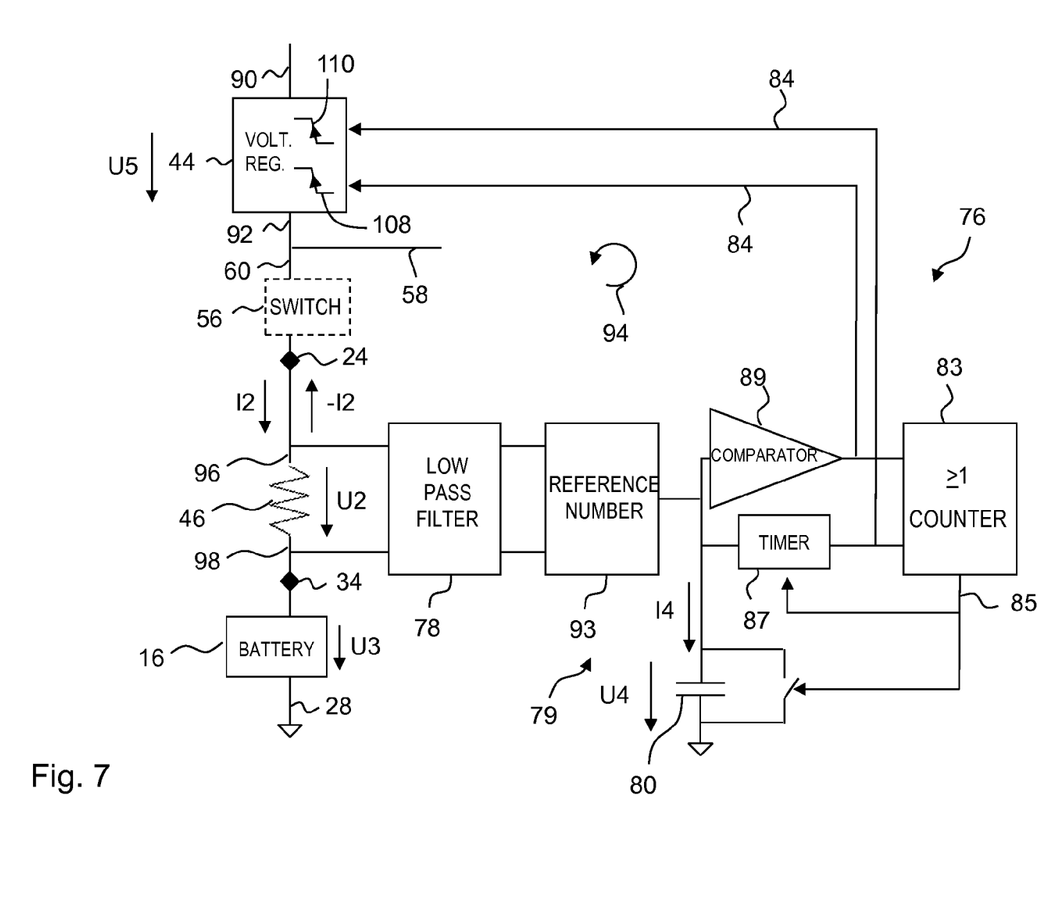
FIG. 7 illustrates the principle of operation of the control mechanism in the example of the third type of battery charging circuit.

FIG. 7 schematically illustrates an example of the current control loop 94 based on the second implementation of the metering circuit 76. The current control loop 94 may also be realized using another build of metering circuit. As an example, the line-up of the second implementation may be dimensioned such that the voltage U4 at the integration capacitor 80 crosses the predefined thresholds for an integrated charge of e.g. 400 μC. This means that a threshold is reached when an average current of e.g. 100 mA flows through the sense resistor 46 during a period of 4 ms. The period required to actually reach the threshold is compared to the desired period by a timer-comparator 89. A timer 87 timing out before the threshold is reached may indicate that the average current over the timer period was less than desired. Accordingly, the voltage U0 minus U5 applied to the battery 16 may be increased in order to increase the current I2 supplied to it. Analogously, when the threshold was reached before timeout, the voltage U0 minus U5 applied to the battery 16 may be decreased, in order to decrease the current I2 supplied to it.

Figure 8:
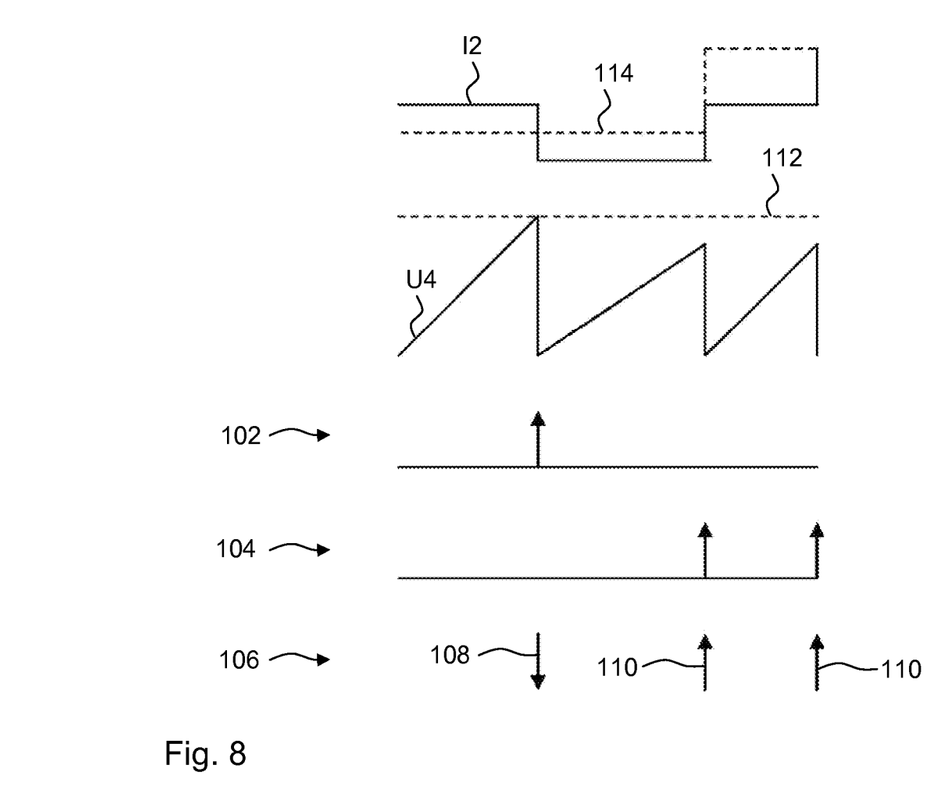
FIG. 8 shows a time diagram of the control mechanism of FIG. 7.

FIG. 8 schematically depicts a possible overall behaviour of the metering circuit 76 according to FIG. 7. It is understood that this basic scheme can further be enhanced by defining multiple timer-comparator windows and associated actions. The reference numbers have the following meaning: 102 comparator signal, 104 timeout signal, 106 voltage regulation command, 108 down, 110 up, 112 threshold, and 114 desired current.

Besides the current control loop 94 comprising the first voltage regulator 44 and the voltage regulator 44, the third type of battery charging circuit 10 may require neither a further current regulator 50, nor a second shunt 40, nor a current value 42, as required in the first and second type of battery charging circuit 10. Therefore, this design may be considered simplified. The concept of the third type of battery charging circuit 10 may facilitate a higher current I2 to the battery 16 supplied from a powerful charger 20. In the example shown, the current control loop 94 only regulates the output voltage of voltage regulator 44, which may facilitate the use of step-down DC/DC converters, instead of linear current/voltage regulators. The third type of battery charging circuit 10 is transparent to the load 18, because the load 18 can draw any current I1 it needs, within a designed operating range.

Figure 9:
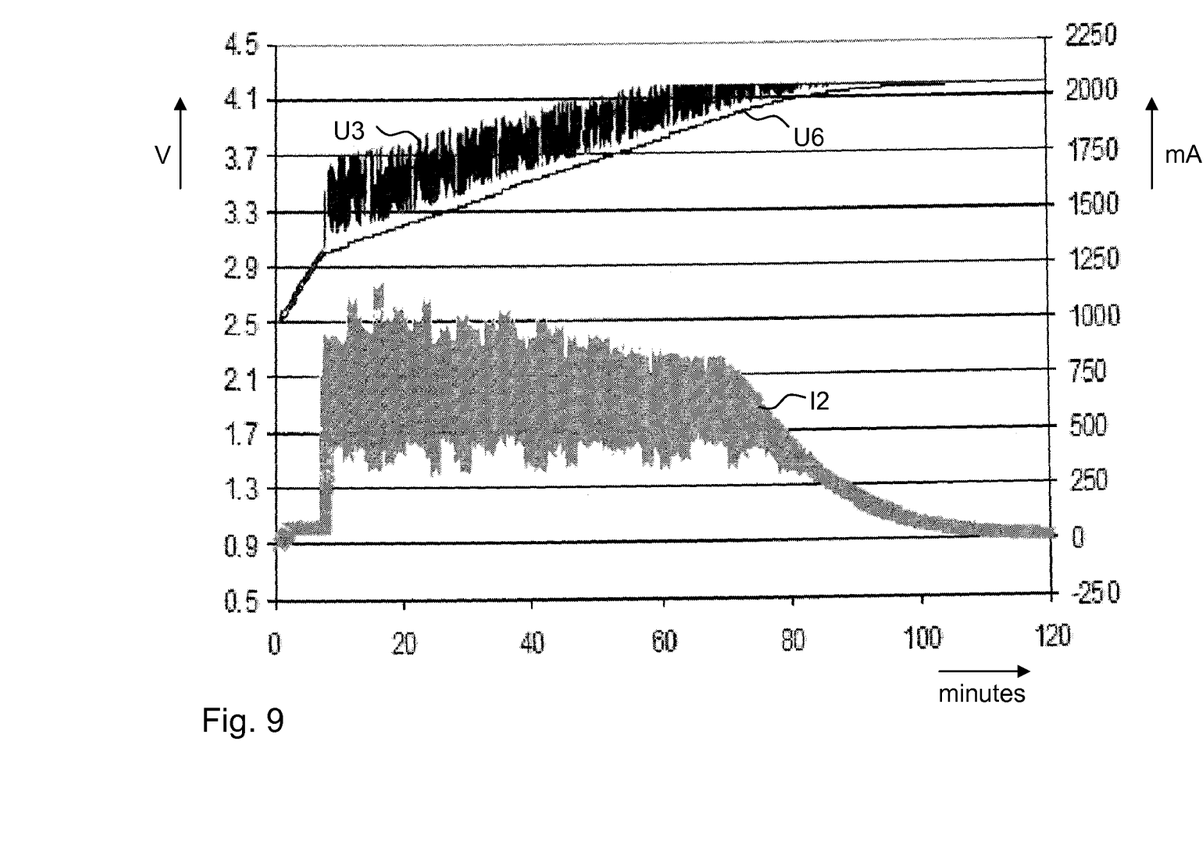
FIG. 9 shows a result of a simulation of the third type of battery charging circuit with a randomly varying application current, close to a real charging case.

FIG. 9 and Table 1 show results of a simulation of an example of the third type of battery charging circuit 10 with a load current I1 varying randomly close to a real charging case.

TABLE 1

| Parameter | Value | Unit |
| --- | --- | --- |
| Current Capability Charger | 1200 | mA |
| Precharge Current <3 V | 80 | mA |
| Charge current for 3 V-4.2 V | 800 | mA |
| Initial Battery Voltage (U6) | 2.5 | V |
| Battery end of charge (U6) | 4.2 | V |
| Cell resistance 74 when full | 250 | mOhm |
| Battery Capacity | 800 | mAh |
| Application current I1 (min) | 0 | mA |
| Application current I1 (max) | 1000 | mA |
| Application current Noise | 100 | mApkpk |
| Application current period | 10 | ms |
| Charger Regulation Step Size | 10 | mV |

When charging a load 18 of a portable device as a mobile phone, the battery 16 and the load 18 share a same supply rail 24. The current I2 into the battery 16 is not allowed to exceed a rating of the battery 16 in order not to reduce a lifetime of the battery 16. Such a battery 16 has for example a capacity of 800 mAh and an allowable charging current of 800 mA. Therefore, conventional battery charging circuits may limit the total current I3 to the charging circuit 10 to the value of an allowable charging current I2 of the battery 16. Therefore, with conventional battery charging circuits 10, the net charging current I2 to the battery 16 is reduced, when the load 18 simultaneously consumed current I1. With the third type of battery charging circuit 10 the current I3 from the charger 20 can be increased to compensate for the current I1 used by the load 18. With the third type of battery charging circuit 10, the charging time of the battery 16 may be shortened during an operation of the portable device 18. The reduction of the charging time may be for example 1.5 h, which results in a total charging time of only 1 h, in contrast to 2.5 h with the conventional battery charging circuit 10. The control scheme of the battery charger 20 of the simulation of FIG. 7 may be as follows. The charge accumulation is performed up to one LSB of the metering circuit 76. If a time to change the LSB is longer than expected, then the measured current to the battery 16 is found to be too low, and the voltage regulation setpoint is increased by e.g. 10 mV with respect to voltage U3. If a time to change the LSB is shorter than expected, then the measured current I2 to the battery 16 is found to be too high, and the voltage regulation setpoint is decreased by e.g. 10 mV with respect to voltage U3. Corresponding two functionalities are provided in the third type of battery charging circuit 10 for the corresponding cases that a negative current −I2 is either too low or too high.

In other words, a battery charging circuit 10 may comprise a first voltage regulator 44, wherein the first voltage regulator 44 has a control input 88 designed for reception of a signal 84 generated by a current metering circuit 76, the current metering circuit 76, and a terminal 34 for connecting a battery 16. The battery charging circuit 10 may comprise a switch 56 connected in series to the voltage regulator 44. The battery charging circuit 10 may comprise a switch 56 connected in series to the current metering circuit 76. The current metering circuit 76 may comprise an integration function. The signal 84 generated by the current metering circuit 76 may contain information about at least one of a measured strength of a current I2 and a charge amount. The electrical connection 60 between the voltage regulator 44 and the switch 56 may comprise an electrical tap 62 for connecting a load 18. The battery charging circuit 10 may comprise a comparison circuit for comparing a strength of an average current I2 through the current metering circuit 76 with a first predetermined threshold, in order to increase an output target voltage of an output voltage U5 of the first voltage regulator 44, when the strength of the average current I2 measured by the current metering circuit 76 exceeds the first predetermined threshold. The battery charging circuit 10 may comprise a comparison circuit for comparing a strength of an average current I2 through the current metering circuit I2 with a second predetermined threshold, in order to decrease an output target voltage of an output voltage U5 of the first voltage regulator 44, when the strength of the average current I2 measured by the current metering circuit 76 under-runs the second predetermined threshold. The first predetermined threshold may either have the same height or may be by a hysteresis value higher than the second predetermined threshold. An output of the current metering circuit 76 is connected to the control input 88 of the voltage regulator 44 via at least one of an electrical, an optical, an acoustical, and a radio connection. In a preferred embodiment, the battery charging circuit 10 does not comprise any current regulation circuit which does not employ the first voltage regulator 44 for current regulation. The battery charging circuit 10 may comprise exactly one shunt 46 for measuring a current I2 using a voltage U2 between terminals 96, 98 of the one shunt 46, wherein the voltage U2 between the terminals 96, 98 of the one shunt 46 is caused by the current I2 to be measured. An electronic device 10, 18, in particular a mobile device, may comprise a battery charging circuit as described above.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciate that conductivity types and polarities of potentials may be reversed.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Each of the devices described, as well as each of the devices claimed, may be realized with a single-die IC, as well with a multi-die IC.

While the principles of the invention have been described above in connection with specific apparatus, it is to be clearly understood that this description is made only by way of example and not as a limitation on the scope of the invention.

The invention claimed is:

1. A battery charging circuit comprising:
    a current metering circuit;
    a voltage regulator, wherein the voltage regulator has a control input designed for reception of a signal generated by the current metering circuit, wherein the battery charging circuit comprises a switch connected in series with the current metering circuit; and
    a terminal for connecting a battery.

2. The battery charging circuit, according to claim 1, wherein the switch is connected in series with the voltage regulator.

3. The battery charging circuit according to claim 2, wherein the electrical connection between the voltage regulator and the switch comprises an electrical tap for connecting a load.

4. The battery charging circuit, according to claim 1, wherein the current metering circuit comprises an integration function.

5. The battery charging circuit according to claim 1, wherein the signal generated by the current metering circuit contains information about at least one of a measured strength of a current and a charge amount.

6. The battery charging circuit according to claim 1, further comprising:
    a first comparison circuit to compare a strength of an average current through the current metering circuit with a first predetermined threshold, in order to increase an output target voltage of an output voltage of the voltage regulator, when the strength of the average current measured by the current metering circuit exceeds the first predetermined threshold.

7. The battery charging circuit according to claim 6, further comprising:
    a second comparison circuit to compare a strength of an average current through the current metering circuit with a second predetermined threshold, in order to decrease an output target voltage of an output voltage of the voltage regulator, when the strength of the average current measured by the current metering circuit underruns the second predetermined threshold.

8. The battery charging circuit according to claim 7, wherein the first predetermined threshold either has the same height or is by a hysteresis value higher than the second predetermined threshold.

9. The battery charging circuit according to claim 1, wherein an output of the current metering circuit is connected to the control input of the voltage regulator via at least one of an electrical, an optical, an acoustical, and a radio connection.

10. The battery charging circuit according to claim 1, wherein the current metering circuit includes only current regulation circuits which employs the voltage regulator for current regulation.

11. The battery charging circuit according to claim 1, further comprising:
    exactly one shunt for measuring a current using a voltage between terminals of the one shunt, wherein the voltage between the terminals of the one shunt is caused by the current to be measured.

12. An electronic device, in particular a mobile device, wherein the electronic device comprises the battery charging circuit according to claim 1.

13. A battery charging circuit comprising:
    a current metering circuit;
    a voltage regulator, wherein the voltage regulator has a control input designed for reception of a signal generated by the current metering circuit, wherein the signal generated by the current metering circuit contains information about at least one of a measured strength of a current and a charge amount; and
a terminal for connecting a battery.

14. The battery charging circuit according to claim 13, wherein the electrical connection between the voltage regulator and a switch comprises an electrical tap for connecting a load.

15. The battery charging circuit of claim 13, further comprising:
a first comparison circuit to compare a strength of an average current through the current metering circuit with a first predetermined threshold, in order to increase an output target voltage of an output voltage of the voltage regulator, when the strength of the average current measured by the current metering circuit exceeds the first predetermined threshold.

16. The battery charging circuit of claim 15, further comprising:
a second comparison circuit to compare a strength of an average current through the current metering circuit with a second predetermined threshold, in order to decrease an output target voltage of an output voltage of the voltage regulator, when the strength of the average current measured by the current metering circuit under-runs the second predetermined threshold.

17. The battery charging circuit according to claim 13, wherein an output of the current metering circuit is connected to the control input of the voltage regulator via at least one of an electrical, an optical, an acoustical, and a radio connection.

18. A method comprising:
receiving, at a control input of a voltage regulator of a battery charging circuit, a signal generated by a current metering circuit, wherein the battery charging circuit includes a terminal to connect to a battery;
comparing, by a first comparison circuit, a strength of an average current through the current metering circuit with a first predetermined threshold; and
increasing an output target voltage of an output voltage of the voltage regulator, in response to the strength of the average current measured by the current metering circuit exceeds the first predetermined threshold.

19. The method of claim 18, further comprising:
comparing, by a second comparison circuit, a strength of an average current through the current metering circuit with a second predetermined threshold; and
decreasing an output target voltage of an output voltage of a voltage regulator, in response to the strength of the average current measured by the current metering circuit under-runs the second predetermined threshold.

20. The method claim 19, wherein the first predetermined threshold either has the same height or is by a hysteresis value higher than the second predetermined threshold.

* * * * *